(12) United States Patent
Revivo et al.

(10) Patent No.: US 11,176,247 B2
(45) Date of Patent: Nov. 16, 2021

(54) SYSTEM AND METHOD FOR CONTAINER ASSESSMENT USING SANDBOXING

(71) Applicant: Aqua Security Software, Ltd., Ramat Gan (IL)

(72) Inventors: Idan Revivo, Tel Aviv (IL); Yaniv Agman, Hod Hasharon (IL); Roi Kol, Jerusalem (IL); Ziv Karliner, Givatayim (IL)

(73) Assignee: AQUA SECURITY SOFTWARE, LTD., Ramat Gan (IL)

( * ) Notice: Subject to any disclaimer, the term of this patent is extended or adjusted under 35 U.S.C. 154(b) by 70 days.

(21) Appl. No.: 16/838,903

(22) Filed: Apr. 2, 2020

(65) Prior Publication Data

US 2021/0312037 A1    Oct. 7, 2021

(51) Int. Cl.
*G06F 21/53*    (2013.01)
*G06F 21/57*    (2013.01)
*G06F 21/56*    (2013.01)

(52) U.S. Cl.
CPC .......... *G06F 21/53* (2013.01); *G06F 21/564* (2013.01); *G06F 21/566* (2013.01); *G06F 21/577* (2013.01)

(58) Field of Classification Search
CPC ...... G06F 21/53; G06F 21/566; G06F 21/564; G06F 21/577
See application file for complete search history.

(56) References Cited

U.S. PATENT DOCUMENTS

| | | | |
|---|---|---|---|
| 9,355,248 B1 * | 5/2016 | Wiest | G06F 21/55 |
| 10,915,628 B2 * | 2/2021 | Stopel | G06F 21/53 |
| 2005/0177635 A1 * | 8/2005 | Schmidt | G06F 9/52 |
| | | | 709/226 |
| 2021/0110047 A1 * | 4/2021 | Fang | G06F 16/27 |

* cited by examiner

*Primary Examiner* — Ali S Abyaneh
(74) *Attorney, Agent, or Firm* — Carlson, Gaskey & Olds, P.C.

(57) ABSTRACT

An example method for a software container includes instantiating the following in a sandbox of a computing device: an operating system, a Berkeley Packet Filter (BPF) virtual machine within a kernel of the operating system, and a software container. The kernel monitors runtime behavior events of the software container, with the monitoring at least partially performed by the BPF virtual machine. Based on the monitoring, a respective risk score is assigned to each of the runtime behavior events that is potentially malicious, with each risk score indicating a likelihood that a corresponding behavior event is malicious. An overall risk score is assigned to the software container that indicates a likelihood that the software container is malicious based on the respective risk scores.

16 Claims, 4 Drawing Sheets

SYSTEM AND METHOD FOR CONTAINER ASSESSMENT USING SANDBOXING

BACKGROUND

This application relates to software containers, and more particularly to detecting whether a software container is malicious.

Virtual machines (VMs) have gained popularity for a variety of computing needs. A virtual machine is a software implementation of a machine that executes programs like a physical machine. A typical virtual machine includes an entire operating system that runs on top of a host operating system, and one or more applications that run within that operating system. Use of VMs enables an administrator to run several operating system instances at the same time on a single server. A specialized application called a hypervisor manages the virtual machines that run on a given server. Running multiple operating system instances on a single machine, however, is resource-intensive.

More recently, software containers are being used as an alternative to running multiple virtual machines. A software container includes a software application plus all of the dependencies required to run the application bundled into one package. The dependencies may include libraries, binaries, and/or configuration files, for example. By containerizing the application and its dependencies, differences in operating system distributions and underlying infrastructure are abstracted away, making it easy to migrate an application between various environments (e.g., development, testing, and production). Multiple containers can be run in isolation from each other on a single host operating system as well, which provides an alternative to running multiple virtual machines (and their accompanying operating systems) on a single server. Because containers allow an administrator to virtualize a single application rather than an entire operating system, running a given quantity of containers is less resource intensive than running the same quantity of VMs.

The term "malware" refers to any software intentionally designed to cause damage to a computing device or computing network. By contrast, software that causes unintentional harm due to some deficiency is typically described as a software "bug." Some example types of malware include viruses, worms, spyware, trojans, and ransomware. Detecting whether a software container includes malware presents challenges, because the container may be configured to behave differently at runtime if its activity is being monitored

SUMMARY

An example method for a software container includes instantiating the following in a sandbox of a computing device: an operating system, a Berkeley Packet Filter (BPF) virtual machine within a kernel of the operating system, and a software container. The kernel monitors runtime behavior events of the software container, with the monitoring at least partially performed by the BPF virtual machine. Based on the monitoring, a respective risk score is assigned to each of the runtime behavior events that is potentially malicious, with each risk score indicating a likelihood that a corresponding behavior event is malicious. An overall risk score is assigned to the software container that indicates a likelihood that the software container is malicious based on the respective risk scores.

An example computing device includes memory and a processor operatively connected to the memory. The processor is configured to instantiate the following in a sandbox of a computing device: an operating system, a BPF virtual machine within a kernel of the operating system, and a software container, the sandbox corresponding to a virtual machine that is different from the BPF virtual machine. The processor is configured to monitor runtime behavior events of the software container, the monitoring performed by the kernel and at least partially performed by the BPF virtual machine. The processor is configured to assign, based on the monitoring, a respective risk score to each of the runtime behavior events that is potentially malicious, each risk score indicating a likelihood that a corresponding behavior event is malicious. The processor is configured to assign an overall risk score to the software container that indicates a likelihood that the software container is malicious based on the respective risk scores.

The embodiments, examples, and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

DETAILED DESCRIPTION

Figure 1:
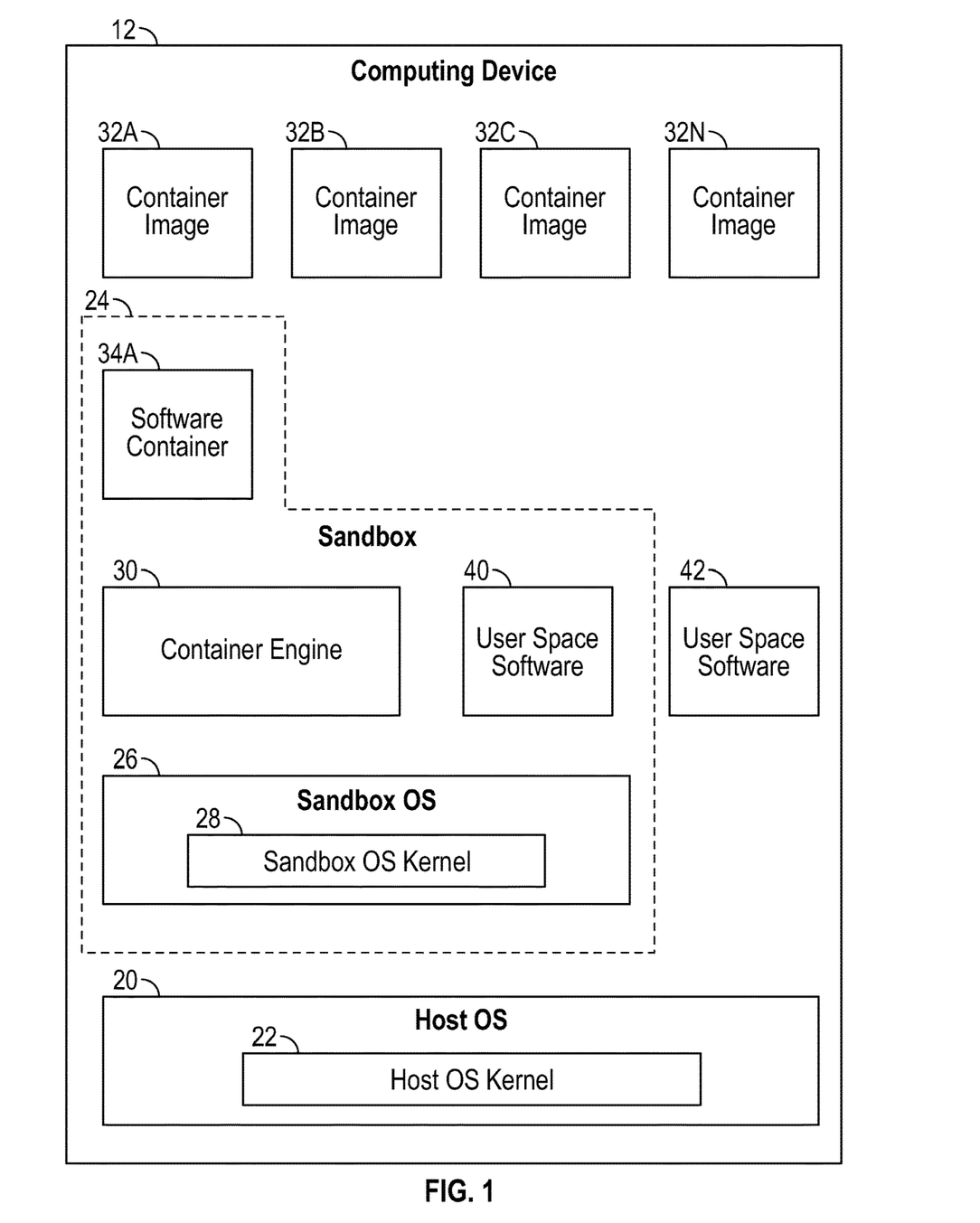
FIG. 1 schematically illustrates an example system for analyzing whether a software container is malicious.

FIG. 1 schematically illustrates an example system 10 for analyzing whether a software container is malicious (i.e., contains or is configured to download malware). In the example of FIG. 1, the system 10 includes a computing device 12 that includes a host operating system (OS) 20 and a host OS kernel 22. A sandbox 24 (e.g., a virtual machine), operates as an isolated environment, and within the sandbox 24 a sandbox OS 26 is instantiated which includes a sandbox OS kernel 28. In one example, the sandbox OS kernel 28 is a LINUX kernel. Optionally, the host OS kernel 22 may also be a LINUX kernel.

The computing device 12 includes a plurality of container images 32A-N that can be instantiated as software containers. In the example of FIG. 1, a container engine 30 (e.g., DOCKER) has instantiated the container image 32A as a software container 34A within the sandbox 24. Although not shown in FIG. 1, other ones of the container images 32B-N could be instantiated as software containers 34 outside the sandbox 24.

User space software 42 outside of the sandbox 24 performs static image scanning of the container image 32A to detect static scanning events that are potentially malicious. The user space software 40 supplements the static scanning by performing dynamic monitoring of runtime behavior events of the software container 34A within the sandbox 24 to detect potentially malicious runtime behavior of the software container 34A. The dynamic monitoring includes monitoring any one or combination of the following types of runtime behavior: system calls to the sandbox OS kernel 28 (e.g., LINUX system calls), requests to utilize security hooks of the sandbox OS kernel 28 (e.g., LINUX capabilities), file system requests to the sandbox OS kernel 28, and network traffic behavior associated with the software container 34A.

The descriptor "user space" indicates that the user space software 40 runs on top of sandbox OS kernel 28, and user space software 42 runs on top of host OS kernel 22, and that the user space software 40, 42 does not run within their respective kernels.

While malware can sometimes be detected through static scanning, a software container 34 may be configured to hide malware through techniques like packers and code obfuscation. For example, an attacker can take a known piece of malware and encrypt it in a way that a static container image scanner could not identify it (e.g., it will have an unrecognized hash, signature, or other static pattern). One example of a "signature" detected by a static scan could be a collection of files appearing in the container image 32A that when present as a group are likely to be or are known to be malicious. Another example of a signature could be a sequence in a binary file which is known to be malicious.

The user space software 40 supplements the static scanning by performing dynamic runtime scanning of the behavior of the software container 34A. Thus, if an attacker tried to unpack malware at runtime and start an attack, the dynamic runtime scanning would be able to detect that, and the detected behavior would happen within the safe environment of the sandbox 24.

The sandbox 24 is an isolated environment within which the container engine 30 and user space software 40 can operate without affecting applications outside of the sandbox 24. As discussed above, in one example the sandbox 24 is a virtual machine. In another example (not shown), the sandbox 24 can be a physical machine that is not a virtual machine. In such a configuration, the sandbox OS 26 could serve as the host OS 20. IN such an example, the user space software 42 may be provided on a separate computing device, to prevent the potentially malicious software container 34A from detecting and/or interfering with the static scanning.

Figure 2:
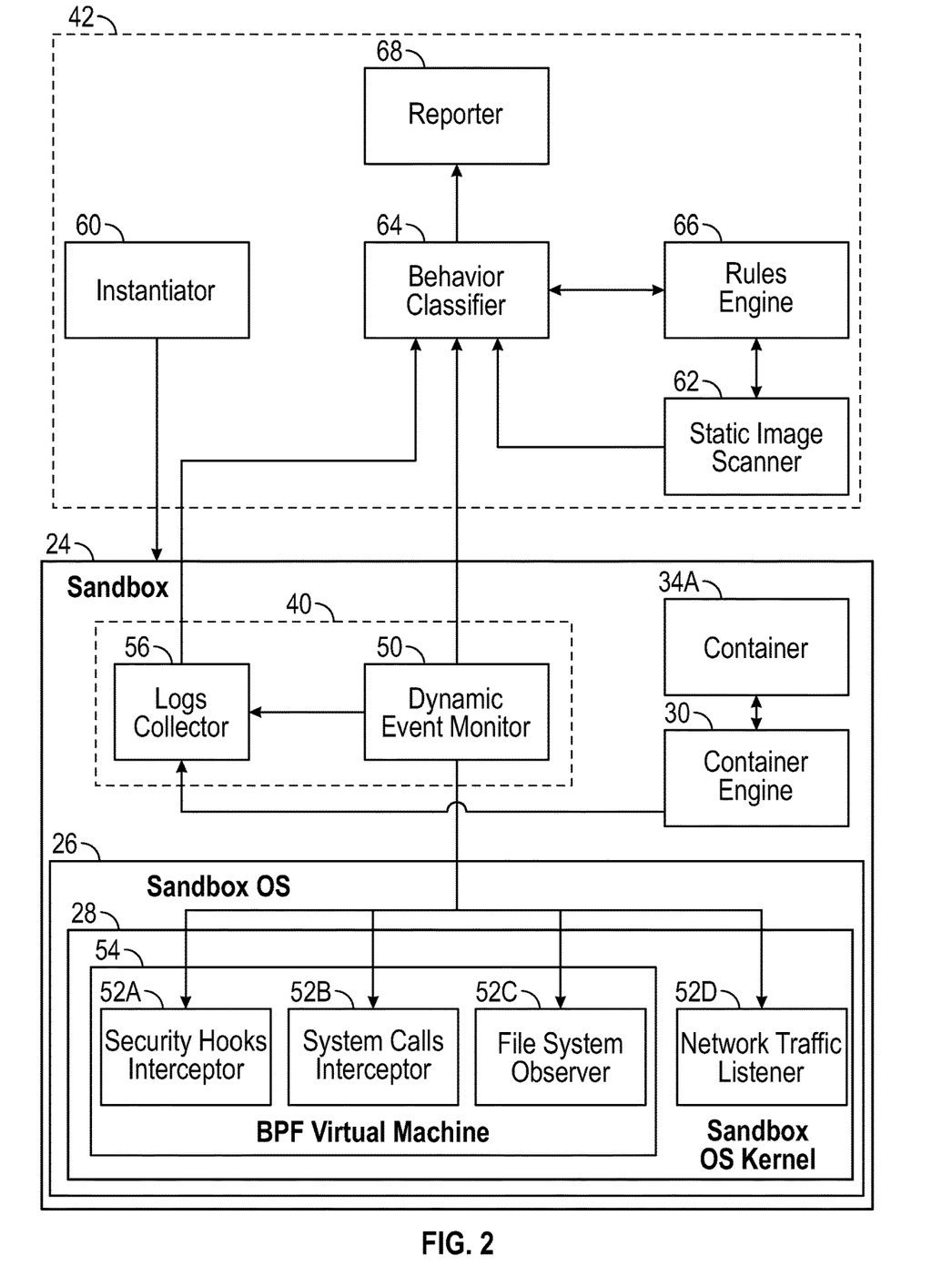
FIG. 2 schematically illustrates example functional components of the system of FIG. 1.

FIG. 2 schematically illustrates example functional components of the system 10 of FIG. 1. In the example of FIG. 2, a dynamic event monitor 50 that runs on top of the sandbox OS 26 aggregates information from a plurality of utilities 52A-D, including a security hooks interceptor 52A, system calls interceptor 52B, file system observer 52C, and network traffic listener 52D. As shown in FIG. 2, each of the utilities 52 operates within the sandbox OS kernel 28, and at least the utilities 52A-C operate within a Berkeley Packet Filter ("BPF") virtual machine 54. The BPF virtual machine 54 also operates within the sandbox OS kernel 28. A regular virtual machine, which may be used for the sandbox 24, typically emulates a full machine, including disk, network, and other hardware. BPF virtual machines emulate processor instructions, but are typically more limited in their functionality compared to a regular virtual machine, as they typically do not emulate a full machine. Optionally, the network traffic listener 52D may also operate from within the BPF virtual machine 54. As use herein, "BPF" can refer to extended BPF or non-extended (i.e., "classic") BPF virtual machine.

Operating the utilities 52-C within the BPF virtual machine 54 provides a number of benefits. One benefit is that the BPF virtual machine 54 makes it harder for the software container 34A to detect that the utilities 52A-C are monitoring its behavior than would be the case if the utilities 52A-C were operating as part of the user space software 40.

In conventional systems, malware can often identify that it is being analyzed because the malware may be able to detect that it is being operated under a "debugger" process, or is being executed in an investigation environment. Using the BPF virtual machine 54 solves this problem by monitoring the software container 34A from the level of the sandbox OS kernel 28, which prevents the malware from detecting that its activity is being monitored. Thus, using the BPF virtual machine 54 makes it much more likely that potentially malicious behavior such as using packers, encryption, obfuscators, and polymorphic malware, will be detected.

Another benefit of using the BPF virtual machine is that if the BPF virtual machine 54 crashes it will not cause the entire sandbox OS kernel 28 to crash.

The security hooks interceptor 52A intercepts security hooks in the sandbox OS kernel 28 with the context of the process which triggered these events. The LINUX kernel provides a framework known as "Linux Security Modules" (LSM) to allow the development and use of security modules in Linux. The framework provides security hooks, which are function calls that are placed in strategic places in the LINUX kernel. Security modules (such as SELinux) register to these hooks by providing callback functions that get invoked when a security hook is being called. Some example security hooks include "security_capable," "security_file_open," and "security_bprm_check."

As an example, LINUX capabilities register to the "security_capable" security hook (see, e.g., (see, e.g., http://man7.org/linux/man-pages/man7/capablilities.7.htlml). As another example, the security hook "security_file_open" is called every time a file is opened in the sandbox OS 26. As another example, the security hook "security_bprm_check" is called whenever a program is being executed in the sandbox OS 26. The security hooks monitored by the security hooks interceptor 52A can include any one or combination of those listed above and/or could include other known LINUX security hooks that are not listed above.

When a process that belongs to the software container 34A causes a LINUX security hook to be called, the requested security hook along with the context of the requesting process will be intercepted, and sent to the Dynamic Event Monitor (20).

The system calls interceptor 52B intercepts system calls made by a monitored process between a user space of the sandbox 24 and a kernel space of the sandbox 24. The system calls interceptor 52B also intercepts the context of the process which triggered the system call and the arguments given to the system call. For example, when a process creates a new file in memory using "memfd_create" system call, the event with the name of the new file and the context of the requesting process will be intercepted, and sent to the dynamic event monitor 50. If that system call is followed by "execve" to execute some code from the new file that could indicate malicious behavior because it means that the process loaded and executed a file from memory, which is usually done when trying to hide detection of files written to disk. In one example, system calls that change a state of the computing environment and/or of some resource (e.g., a file or network) are of particular interest to the system calls interceptor 52B.

The file system observer 52C hooks to file system related events, and looks for processes that try to access files outside of the software container 34A. When such an event is identified, the file system observer 52C intercepts the request with the context of the process which triggered it. For example, when a process tries to open a file which is not part of the container file system, the requested file name along with the context of the requesting process will be intercepted, and sent to the dynamic event monitor (50).

The network traffic listener 52D captures all of the network events which are initiated by the software container 34A and/or are addressed to the software container 34A. In one example, the TCPdump LINUX utility is utilized as the network traffic listener 52D.

As used herein, the "context" of an event (e.g., a requested command such as a LINUX capability or system call, a file system request, or a network traffic request) could include any one or more of the following: what process and/or thread requested to perform the behavior, a timestamp of the request, what the result of the behavior was (e.g., what the result of a command), what arguments were used in the request (e.g., to make a command), the ID of the parent process that made the request at issue and/or an identifier of the namespaces of the process that made the request at issue.

A logs collector 56 aggregates the runtime behavior monitored by the dynamic event monitor 50. The logs collector 56 also collects a runtime behavioral log from the container engine 30 (e.g., as provided by known container engine functionality, such as DOCKER logs).

In the example of FIG. 2, the user space software 42 includes an instantiator 60, a static image scanner 62, a behavior classifier 64, a rules engine 66, and a reporter 68. The instantiator 60 is configured to instantiate the sandbox 24 (e.g., as a virtual machine). The instantiator 60 may also configured to instantiate other sandboxes for other ones of the container images 32, or instantiate the ones of the container images 32 known to be safe outside of a sandbox.

The static image scanner 62 is configured to perform static scanning of the container image 32A, which includes analyzing metadata of the container to determine a list of files, environment variables, and the entrypoint of the container image 32A and comparing those items against known malicious items from the rules engine 66. The rules engine 66 includes one or more databases of known malicious indicators, including behavioral events and static scanning events. The "entrypoint" of a container refers to the first process that is launched by the container when it is instantiated.

The behavior classifier 64 receives a description of runtime behavior events of the software container 34A from the dynamic event monitor 50, either directly or from the logs collector 56, and optionally also receives a runtime behavior log that is gathered from the container engine 30. The behavior classifier 64 assigns a respective risk score to each of the runtime behavior events that is potentially malicious. Each risk score indicates a likelihood that a corresponding behavior event is malicious, and is selected from a pre-defined set of risk scores.

The behavior classifier 64 also compares static scanning events from the static image scanner 62 (e.g., files in the container, hashes of files in the container, bit patterns detected in files in the container, environment variables of the container image 32A, the container entrypoint of the container 32A, etc.) against criteria in the rules engine 66 to determine a likelihood that the software container 34A is malicious.

In one example, the behavior classifier 64 is also able to detect machine fingerprinting to determine the environment on which it runs (e.g., CPU features and or OS version), and can also detect OS manipulations (e.g., through LINUX capabilities requests).

In one example, the set of risk scores includes the following scores, arranged in order of increasing risk of maliciousness:

1. Informative—this is a behavior that has some potential to be malicious (e.g., in connection with another behavior event and/or file), but by itself is not malicious.
2. Low risk—this is a behavior that is more likely than an "informative" event to be malicious, but is still unlikely to be malicious.
3. Medium risk—this is a behavior that is generally not supposed to happen and is more likely to be malicious than a "low risk" item, but there may still be a valid explanation for it.
4. High risk—this is a behavior that most likely indicates malware.
5. Critical risk—this is a behavior that is deemed to be malware.

The reporter 68 reports the analysis of the behavior classifier 64 (e.g., by transmitting a user-friendly report to an administrator and/or updating the metadata of the container image 32A). In one example, the report is generated in JavaScript Object Notation (JSON), HTML, and/or MongoDB. Of course, other formats could be used.

The utilities 52A-D will now be described in greater detail in conjunction with a discussion of example static scanning events and runtime behavior events.

Static Scanning Events

The attributes of the various container images 32, such as their files and environment variables, can be determined using the container engine 30.

The static image scanner 62 performs static scanning of the container image 32A to detect static scanning events that may be potentially malicious. This includes, for example, determining the files in the container image 32A, determining a hash of those files, determining bit segments in the files, determining environment variables defined by the container image 32A, and determining an entrypoint of the container (which although typically defined by a container image, may be manually overridden). Although an environment variable and/or container entrypoint may not indicate malicious behavior on their own, they may indicate unusual behavior (e.g., the environment variable LD_PRELOAD which can be used to inject a library into a process in LINUX, and is not normally set).

In one example, the static image scanner 62 determines a hash of the files in the container image 32 (individually and/or collectively) and determines that one of the hashes is "c29dfe75862b6aed91bec4ffc7b20b9c." This hash corresponds to known malware, and would cause the behavior classifier 64 to assign a risk score of "critical" to the container image 32A.

As another example, the static image scanner 62 detects that the pattern "%@AP[4\PZX54(P^)7CC)7}$EIC' is found in a series of bits of the container image 32A. This pattern corresponds to known malware, and would cause the behavior classifier 64 to assign a risk score of "critical" to the container image 32A.

Runtime Behavior Events

As used herein, a "runtime behavior event" can correspond to a single event or to a series of related events. As an example, assume that the software container 34A downloads a file and then subsequently tries to execute that file. On their own these events may not be particularly suspicious, but together combined they indicate what is likely malicious behavior, and may therefore be assigned a severity score of "high." This behavior set may be detected by the network traffic listener 52D (request to download file) and the system calls interceptor 52B (request to execute the file, such as through the "execve" system call).

Some additional examples of potentially malicious runtime behavior events are described below.

If the software container 34A tries to access a known IP address that is malicious and blacklisted, that single event could be assigned a risk score of "critical," because there is likely no non-malicious reason for the software container 34A to access that IP address. This behavior could be detected by the network traffic listener 52D, for example.

If the command "/etc/selinux sestatus" was executed during runtime, that means the software container 34A is attempting to modify the security configuration of the sandbox OS 26. This could be given a severity score of "medium" in one example because although this is not normal, there may be a reasonable explanation for it. This behavior could be detected by the system calls interceptor 52B, for example.

If a reverse shell connection is requested through the following sequence of system calls, this is suspicious because this is how one executes commands on a remote host through a command-and-control (C&C) configuration "Socket( )", then "connect( )", then "dup( )", then "execve ("/bin/sh")". This could be given a severity score of "critical" in one example because C&C is associated with malware such as rootkits and ransomware. This behavior could be detected by the system calls interceptor 52B, for example.

If the software container 34A tried to access an Internet Protocol (IP) address without a corresponding Domain Name Server (DNS) request to resolve a domain name to the IP address, this is suspicious because it is commonly performed by malware. This behavior could be assigned a severity score of "medium" in one example because there may still be a reasonable explanation for the behavior. This behavior could be detected by the network traffic listener 52D, for example.

If the software container 34A connects a known crypto-mining pool server (e.g., "adzjzewsma.cf") that could be evidence that the software container 34A is operating as a secret cryptomining device. This behavior could be assigned a severity score of "high" because it is most likely malicious, but may not be malicious (e.g., if the container author intends to perform cryptomining) This behavior could be detected by the network traffic listener 52D, for example.

If the software container 34A tries to read the file "/proc/cpuinfo" file this could potentially be malicious because a cryptominer may be attempting to analyze the features of the CPU, which can then be used to trigger specific flags in the cyprominer. However, there also may be a non-malicious reason for reading this file if CPU optimization is desired outside of a cryptomining context. Thus, this behavior may be assigned a score of "informative." This behavior could be detected by the system calls interceptor 52B, for example.

If the software container 34A attempted to use the system call PTRACE or the LINUX capability CAP_PTRACE, this indicates that the software container 34A is trying to inject code into another process. Although this may have a valid purpose (e.g., for debugging), it is commonly used for malware. This may be assigned a severity score of "high" due to the likelihood that it is being used for malware. This may be detected by the security hooks interceptor 52A (request for CAP_PTRACE) and/or the system calls interceptor 52B (request for PTRACE), for example. The context captured for this request could include the timestamp, process ID of the requesting process which triggered the event, parent process ID, etc., for example.

As part of analyzing the runtime behavior log from the container engine 30, the behavior classifier 64 could monitor output from running programs (e.g., through STDOUT). This could include graphical output to be displayed on an electronic display and/or could include non-displayed binary data, for example. Thus, if the screen output includes a ransomware message and/or something unexpected, such as screen output for a specific string indicating that Java is executed in debug mode, this could be indicative of malicious behavior.

Figure 3:
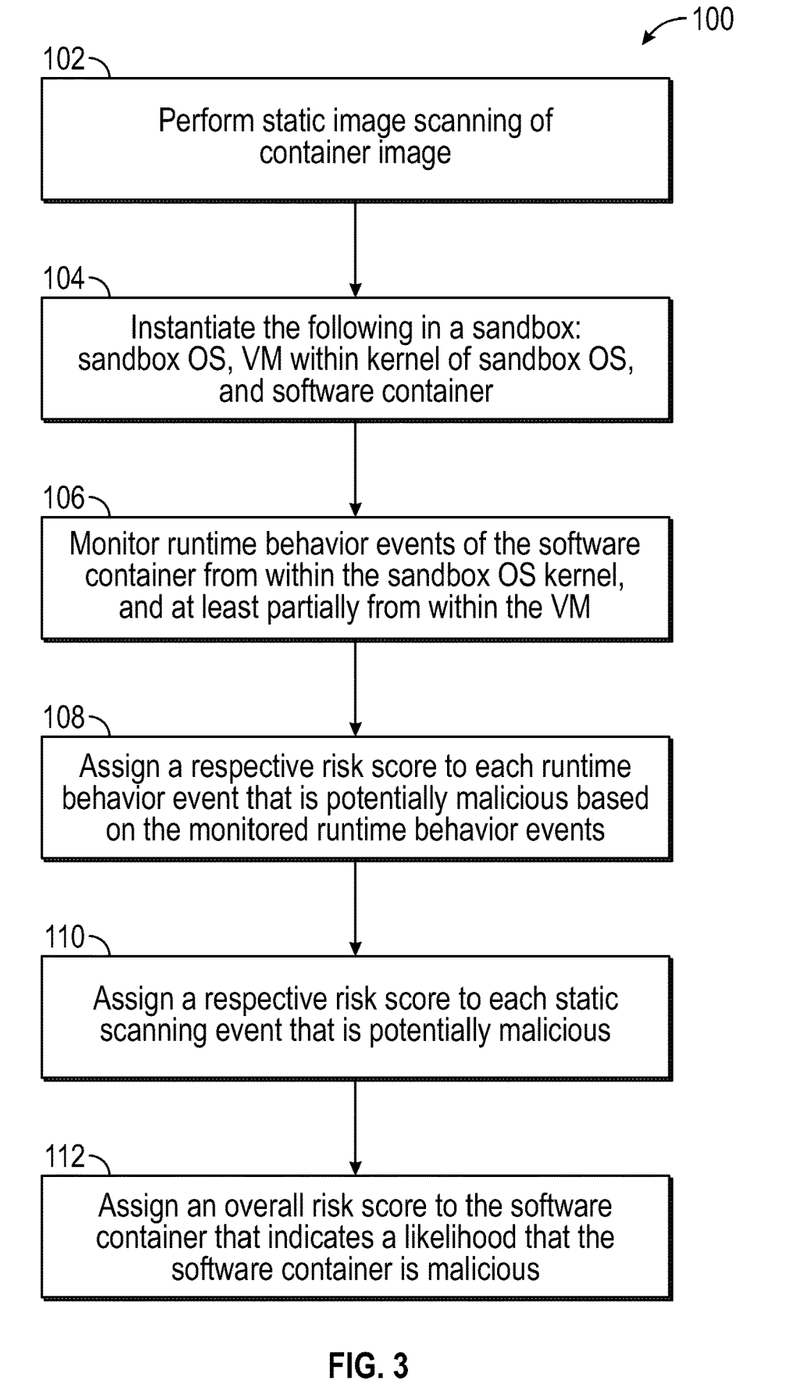
FIG. 3 is a flowchart of an example method for analyzing whether a software container is malicious.

FIG. 3 is a flowchart 100 of an example method for analyzing whether a software container 34A is malicious. The static image scanner 62 performs static image scanning of the content of the container image 32A (e.g., files in the container image, hashes of files in the container image, bit patterns detected in files in the container image, environment variables of the container image 32A, the container entrypoint of the container image, etc.) (step 102).

The instantiator 60 instantiates the following in the sandbox 24: the sandbox OS 26, the BPF virtual machine 54 in the sandbox OS kernel 28 of the sandbox OS 26, and the software container 34A (step 104). In one example, if the sandbox 24 corresponds to a virtual machine, the instantiator 60 also instantiates the virtual machine (e.g., using a hypervisor software utility that is not shown).

The dynamic event monitor 50 monitors runtime behavior events of the software container 34A from within the sandbox OS kernel 28, and at least partially within the BPF virtual machine 54 (step 106). As discussed above, the utilities 52A-C operate within the BPF virtual machine 54, and the utility 52D may operates within the sandbox OS kernel 28 and optionally may also operate within the BPF virtual machine 54.

The behavior classifier 64 assigns a respective risk score to each runtime behavior event that is potentially malicious based on the monitoring of step 106 (step 108). Optionally, the behavior classifier 64 also assigns a respective risk score to each runtime behavior event that is potentially malicious from a runtime behavior log of the container engine 30.

The behavior classifier 64 and/or static image scanner 62 assign a respective risk score to each static scanning event from step 102 that is potentially malicious (step 110).

The behavior classifier 64 assigns an overall risk score to the software container 34A that indicates a likelihood that the software container 34A is malicious (step 112).

In one example, the behavior classifier 64 assigns a highest severity risk score of the respective risk scores of the software container 34A (i.e., of the risk scores for runtime behavior events and static scanning events) as the overall risk score for the software container 34A. Thus, if any runtime behavior or static scanning event has a score of "critical" then the entire software container 34A receives a score of "critical."

Figure 4:
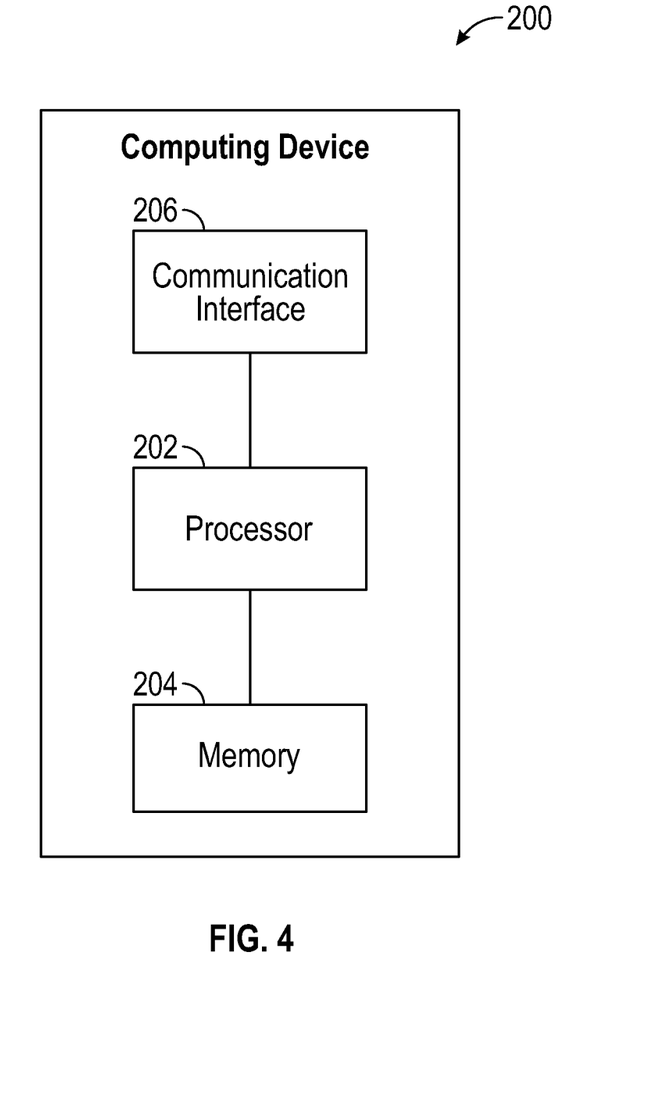
FIG. 4 schematically illustrates an example computing device that may be used in the system of FIG. 1.

FIG. 4 schematically illustrates an example computing device 200 that may be used in the system of FIG. 1 as the computing device 12. The computing device 200 includes a processor 202 operatively connected to memory 204 and a communication interface 206. The processor 202 includes processing circuitry to perform one or more of the steps of method 100. The processor 202 may include one or more microprocessors, microcontrollers, application specific integrated circuits (ASICs), or the like, for example.

The memory 204 can include any one or combination of volatile memory elements (e.g., random access memory (RAM, such as DRAM, SRAM, SDRAM, VRAM, etc.)) and/or nonvolatile memory elements (e.g., ROM, hard drive, tape, CD-ROM, etc.). Moreover, the memory 204 may incorporate electronic, magnetic, optical, and/or other types of storage media. The memory 204 can also have a distributed architecture, where various components are situated remotely from one another, but can be accessed by the processor 202. In one example, the memory 204 stores the container image 32A and rules engine 66.

The communication interface 206 is configured to facilitate communication between the computing device 200 and other computing devices (e.g., over a computer network).

By dynamically monitoring runtime behavior of the software container 34A, the system 10 is able to detect malicious behavior that would otherwise not be detectable by static scanning alone (e.g., container escapes, reverse shell backdoors, file-less malware, crypto miners, code injection backdoors, payload unpacking and execution, network anomalies, and more).

Although example embodiments have been disclosed, a worker of ordinary skill in this art would recognize that certain modifications would come within the scope of this disclosure. For that reason, the following claims should be studied to determine the scope and content of this disclosure.

What is claimed is:

1. A method for a software container, comprising:
    performing static image scanning of a container image outside of a sandbox of a computing device;
    assigning, based on the static scanning, a respective container image risk score to each static scanning event of the container image that is potentially malicious, each container image risk score indicating a likelihood that a corresponding static scanning event is malicious;
    instantiating in the sandbox of the computing device: an operating system, a Berkeley Packet Filter (BPF) virtual machine within a kernel of the operating system, and a software container, wherein the software container is instantiated from the container image;
    monitoring runtime behavior events of the software container, the monitoring performed by the kernel and at least partially performed by the BPF virtual machine;
    assigning, based on the monitoring, a respective runtime risk score to each of the runtime behavior events that is potentially malicious, each runtime risk score indicating a likelihood that a corresponding behavior event is malicious; and
    assigning an overall risk score to the software container that indicates a likelihood that the software container is malicious, the overall risk score corresponding to a highest severity risk score of the container image and runtime risk scores.

2. The method of claim 1, wherein the software container is instantiated by a container engine, the method comprising:
    further monitoring runtime behavior events of the software container from outside the sandbox by reviewing a runtime behavior log file from the container engine;
    wherein said assigning the overall risk score is further based on said reviewing the runtime behavior log file.

3. The method of claim 1, wherein said monitoring comprises:
    monitoring at least one first type of behavior of the software container by the BPF virtual machine; and
    monitoring a second type of behavior of the container that is different from the at least one first type of behavior.

4. The method of claim 3, wherein the kernel is a LINUX kernel and the at least one first type of behavior includes one or more of:
    system calls to the LINUX kernel;
    requests to utilize LINUX security hooks; and
    file system requests to the LINUX kernel.

5. The method of claim 4, wherein the second type of behavior includes network traffic behavior associated with the software container.

6. The method of claim 5, wherein said monitoring the second type of behavior of the container is performed by the kernel but outside of the BPF virtual machine.

7. The method of claim 5, wherein said monitoring the second type of behavior of the container is performed by the BPF virtual machine.

8. The method of claim 1, wherein the assigning of the container image and runtime risk scores and the overall risk score are performed outside of the sandbox.

9. A computing device comprising:
    memory; and
    a processor operatively connected to the memory, the processor configured to:
        perform static image scanning of a container image outside of a sandbox of a computing device;
        assign, based on the static scanning, a respective container image risk score to each static scanning event of the container image that is potentially malicious, each container image risk score indicating a likelihood that a corresponding static scanning event is malicious;
        instantiate in the sandbox of the computing device: an operating system, a Berkeley Packet Filter (BPF) virtual machine within a kernel of the operating system, and a software container, the sandbox corresponding to a virtual machine that is different from the BPF virtual machine, wherein the software container is instantiated from the container image;
        monitor runtime behavior events of the software container, the monitoring performed by the kernel and at least partially performed by the BPF virtual machine;
        assign, based on the monitoring, a respective runtime risk score to each of the runtime behavior events that is potentially malicious, each runtime risk score indicating a likelihood that a corresponding behavior event is malicious; and
        assign an overall risk score to the software container that indicates a likelihood that the software container is malicious, the overall risk score corresponding to a highest severity risk score of the container image and runtime risk scores.

10. The computing device of claim 9, wherein the software container is instantiated by a container engine and the processor is configured to:
    further monitor runtime behavior events of the software container from outside the sandbox by reviewing a runtime behavior log file from the container engine; and
    further base the assignment of the overall risk score on the reviewing of the log file.

11. The computing device of claim 9, wherein to monitor the runtime behavior events, the processor is configured to:
    monitor at least one first type of behavior of the software container by the BPF virtual machine; and
    monitor a second type of behavior of the container that is different from the at least one first type of behavior.

12. The computing device of claim 11, wherein the kernel is a LINUX kernel and the at least one first type of behavior includes one or more of:
    system calls to the LINUX kernel;
    requests to utilize LINUX security hooks; and
    file system requests to the LINUX kernel.

13. The computing device of claim 12, wherein the second type of behavior includes network traffic behavior associated with the software container.

14. The computing device of claim 13, wherein the monitoring of the second type of behavior of the container is performed by the kernel but outside of the BPF virtual machine.

15. The computing device of claim 13, wherein the monitoring of the second type of behavior of the container is performed by BPF virtual machine.

16. The computing device of claim 9, wherein the processor is configured to assign the container image and runtime risk scores and the overall risk score outside of the sandbox.

* * * * *